US008187991B2

(12) United States Patent
Osaheni et al.

(10) Patent No.: US 8,187,991 B2
(45) Date of Patent: May 29, 2012

(54) METHODS FOR REGENERATION OF ADSORBENT MATERIAL

(75) Inventors: John Aibangbee Osaheni, Clifton Park, NY (US); Thomas Joseph Fyvie, Schenectady, NY (US); Deborah Ann Haitko, Schenectady, NY (US); Gregory Allen O'Neil, Clifton Park, NY (US); Paul Burchell Glaser, Albany, NY (US)

(73) Assignee: General Electric Company, Schenectady, NY (US)

( * ) Notice: Subject to any disclaimer, the term of this patent is extended or adjusted under 35 U.S.C. 154(b) by 884 days.

(21) Appl. No.: 12/137,246

(22) Filed: Jun. 11, 2008

(65) Prior Publication Data

US 2009/0312176 A1 Dec. 17, 2009

(51) Int. Cl.
*B01J 38/56* (2006.01)

(52) U.S. Cl. .............. 502/31; 502/29; 502/33; 502/514; 502/515; 502/518

(58) Field of Classification Search ............ 502/22, 502/25, 28, 29, 31, 32, 33, 439, 401, 515, 502/516, 517, 518
See application file for complete search history.

(56) References Cited

U.S. PATENT DOCUMENTS

| 3,996,335 | A | 12/1976 | Wolk et al. |
| 4,552,735 | A | 11/1985 | Iannicelli et al. |
| 5,310,717 | A | 5/1994 | Delzer et al. |
| 5,326,385 | A | 7/1994 | Rajani et al. |
| 5,472,613 | A | 12/1995 | Schofield |
| 5,853,579 | A | 12/1998 | Rummler et al. |
| 5,942,457 | A | 8/1999 | Santos |
| 6,245,223 | B1 | 6/2001 | Gorbaty et al. |
| 6,312,528 | B1 | 11/2001 | Summerfield et al. |
| 6,342,462 | B1 * | 1/2002 | Kulprathipanja ............... 502/25 |
| 6,635,595 | B2 * | 10/2003 | Kaimal et al. ................... 502/33 |
| 2004/0118748 | A1 | 6/2004 | Lesemann et al. |
| 2004/0118749 | A1 | 6/2004 | Lesemann et al. |
| 2004/0242404 | A1 * | 12/2004 | Hwang et al. ................... 502/20 |
| 2007/0227951 | A1 | 10/2007 | Thirugnanasampanthar et al. |

FOREIGN PATENT DOCUMENTS

| EP | 0611071 | A1 | 8/1994 |
| EP | 2003186 | A1 | 12/2008 |
| WO | 9426409 | A1 | 11/1994 |

* cited by examiner

*Primary Examiner* — Edward Johnson
(74) *Attorney, Agent, or Firm* — Armstrong Teasdale LLP

(57) ABSTRACT

A method of regenerating adsorbent material includes providing a spent adsorbent material and contacting the adsorbent material with a solvent composition to facilitate removing oil and impurities from the spent solvent material.

11 Claims, 6 Drawing Sheets

METHODS FOR REGENERATION OF ADSORBENT MATERIAL

BACKGROUND OF THE INVENTION

The field of the disclosure relates generally to regenerating adsorbent material, and more particularly, to methods and systems that remove oil and contaminating materials from spent adsorbent materials.

At least some known industrial facilities include components that operate by combusting a stream of fuel with a stream of inlet air. To obtain such a fuel, at least some known industrial facilities use hydrocarbon oils such as crude oil. However, as is known in the art, hydrocarbon oils, such as heavy fuel oils, contain at least small amounts of contaminating deleterious materials such as sulfur, vanadium, and/or nickel compounds. Such contaminants, as well as others, limit the direct use of crude oil or heavy oils as a fuel. As such, at least some known industrial facilities use a purifying process to remove contaminating materials from the crude oil or heavy oil prior to using it as fuel.

At least some known oil purification processes pass a heavy oil through an adsorption column that is packed with an adsorbent material having a strong affinity for sulfur, vanadium, and nickel compounds. As the oil contacts the adsorbent material, the contaminants, and at least a portion of the oil, are adsorbed into the material in the column, and thus, a purified oil that is useful as a fuel feed stream is produced. However, once the adsorbent material is saturated with oil, metal compounds, and other impurities, the adsorbent material must either be replaced with new adsorbent material, or removed and cleaned prior to being re-packed into an adsorption column. Some known adsorbent regeneration methods use thermal regeneration at high temperatures to rid the material of organics. However, the amount of energy and downtime required for such a regeneration method may increase the operational and maintenance costs of industrial facilities and decrease the overall efficiency of the system.

BRIEF DESCRIPTION OF THE INVENTION

In one aspect, a method of regenerating adsorbent material is provided. The method includes providing a spent adsorbent material and contacting the adsorbent material with a solvent composition to facilitate removing oil and impurities from the spent adsorbent material.

In another aspect, a method for regenerating adsorbent material is provided. The method includes inserting absorbent material into an adsorption device and directing at least one of an oil and an oil/petroleum ether solution through the adsorption device. The method further includes directing a first solvent through the adsorption device to facilitate recovering at least a portion of the oil remaining in the adsorption device. In addition, the method includes directing a second solvent through the adsorption device and directing the first solvent through the adsorption device to facilitate removing at least a portion of the second solvent remaining in the adsorption device.

In a further aspect, a system for regenerating spent adsorbent material is provided. The system includes at least one adsorption device comprising spent adsorbent material packed therein. The system further includes a solvent recovery device coupled in flow communication to the adsorption device. The solvent recovery device is configured to receive a solvent composition after the solvent composition has passed through the adsorption device.

DETAILED DESCRIPTION OF THE INVENTION

Figure 1:
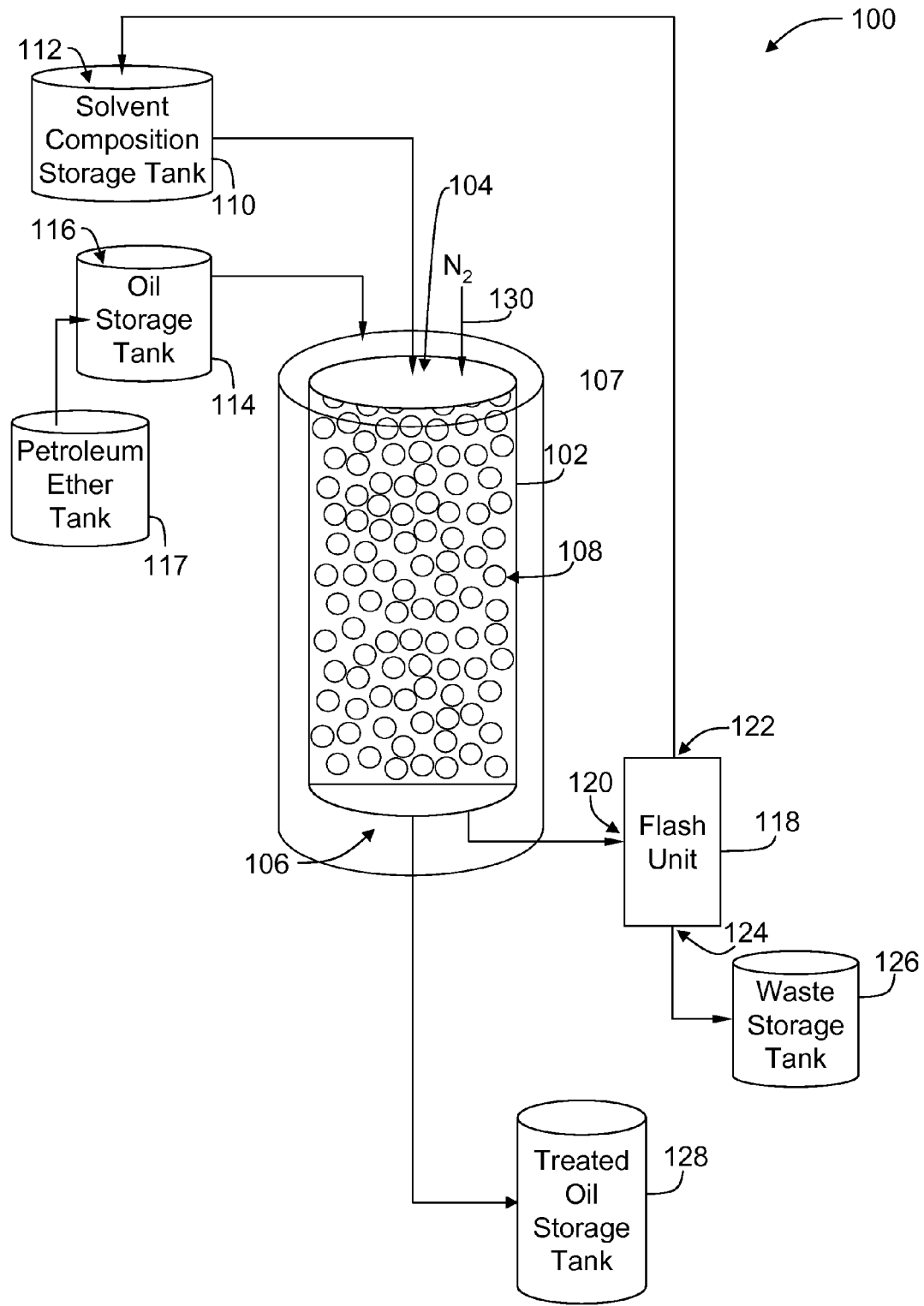
FIG. 1 is a schematic diagram of an exemplary regeneration system.

It is desirable to provide a system for use in regenerating spent adsorbent materials that is both cost efficient and operationally efficient. FIG. 1 is a schematic illustration of an exemplary regeneration system 100. In the exemplary embodiment, regeneration system 100 includes at least one adsorption column 102. Adsorption column 102 has a feed end 104 and an outlet end 106, and includes adsorbent material 108 that is packed therein. In the exemplary embodiment, an optional jacket 107 surrounds adsorption column 102. In an alternative embodiment, system 100 may include any adsorption bed, including but not limited to, a fixed adsorption bed, a batch stirred tank, or a continuous stirred tank reactor.

Adsorbent material 108 may be any kind of material that has the necessary adsorption capacity for vanadium, nickel, and sulfur compounds. For example, in one embodiment, adsorbent 108 is an inorganic silica adsorbent material—usually in particle form. As used herein, the term "silica" can refer to silica gels, fumed silicas, or precipitated silicas including those that have been subjected to surface treatment or other chemical modifications. The silica may be in hydrogel or a xerogel form. Some examples of suitable adsorbents include, but are not limited to, those available from PQ Corporation, such as Britesorb® C930, C935, D350 EL, D300 CE, A100, and R100. In the exemplary embodiment, adsorbent material 108 is Britesorb® D350 EL. In an alternative embodiment, adsorbent material 108 may be any polar adsorbent, such as, but not limited to, clays and/or alumina material.

In addition, in the exemplary embodiment, system 100 includes a solvent composition storage tank 110 for use in storing solvent composition 112. Tank 110 is upstream from, and in flow communication with, adsorption column 102. In the exemplary embodiment, solvent composition 112 is a mixture that contains at least one polar compound and at least one non-polar compound. For example, the polar compound may be, but is not limited to, acetone, alcohols, such as isopropanol, ethanol, and methanol, methylene chloride, ethyl acetate, and/or combinations thereof. Moreover, the non-polar compound may be, but is not limited to, hexane, heptane, methylcyclopentane, pentane, benzene, toluene, cyclohexane, and/or combinations thereof. In one embodiment, solvent composition 112 includes from about 0 weight % to about 100 weight % ethyl acetate and from about 0 weight % to about 100 weight % cyclohexane. In another embodiment, solvent composition 112 includes 59 weight % acetone and 41 weight % hexane. In a further embodiment, solvent composition 112 includes 33 weight % isopropanol and 67 weight % cyclohexane. Azeotrope mixtures may also be desirable in solvent composition 112 where solvent recovery involves heating, as is described in more detail below. In the exemplary embodiment, the boiling point of solvent composition 112 is below about 80° C. and has Hansen parameters that are comparable with adsorbent material 108 and a crude oil 116.

Moreover, in the exemplary embodiment, system 100 also includes an oil storage tank 114 for use in storing crude oil or heavy oil 116 and a petroleum ether storage tank 117 for use in storing petroleum ether (not shown) that may be mixed with oil 116. Oil tank is coupled upstream from, and in flow communication with, adsorption column 102. The oil may be, but is not limited to, Saudi light, Saudi heavy, Arabian super light, Arabian extra light, gas condensate, Arabian light, Arabian medium, Banoco, Arabian heavy, Berri extra light, Abqaiq extra light, marjan Arabian medium, sulif Arabian medium, Chilean crude oil, Brazilian crude oil, and products derived by blending and/or processing thereof. In the exemplary embodiment, Saudi heavy crude oil is used.

In the exemplary embodiment, system 100 also includes a flash unit 118 that is coupled in flow communication downstream from adsorption column 102. In an alternative embodiment, flash unit 118 may be replaced with any solvent recovery device, such as, but not limited to, a distillation column. Flash unit 118 includes an inlet portion 120 and first and second outlet portions 122 and 124, respectively. In the exemplary embodiment, inlet portion 120 is coupled in flow communication downstream from adsorption column 102, first outlet portion 122 is coupled in flow communication upstream from solvent composition storage tank 110, and second outlet portion 124 is coupled in flow communication upstream from a waste storage tank 126. In addition, in the exemplary embodiment, system 100 also includes a treated oil storage tank 128 coupled downstream from, and in flow communication to, adsorption column 102.

In operation, adsorbent material 108 is slurried with a solvent to pre-treat the adsorbent particles. In the exemplary embodiment, the solvent is petroleum ether. Alternatively, the solvent may be any combination of pentane, hexane, heptane, and isomers thereof. Those skilled in the art should understand that some types of petroleum ether are referred to as "benzene" or "X4", and such may be used as a mixture of hydrocarbon, non-polar solvents. For example, petroleum ether can be obtained from petroleum refineries as that portion of the distillate that is between the lighter naphtha and the heavier kerosene. Petroleum ether usually has a specific gravity between about 0.6 and 0.8 and a boiling range of about 30° C. to about 60° C., depending on the particular grade. The adsorbent material/solvent slurry is packed in adsorption column 102, and solvent is circulated throughout adsorption column 102 to expel any air bubbles that may be present in adsorption column 102.

In an alternative embodiment, the adsorbent particles are dried prior to contacting the solvent. Drying can be achieved through various techniques. For example, the adsorbent can be heated under vacuum at temperatures between about 80° C. to about 250° C. to facilitate removing surface moisture.

Oil 116 is then diluted with a solvent in a ratio of about 1:1 to about 10:1 of solvent to oil. By diluting oil 116 with the solvent, the viscosity of the resulting mixture is lower than that of the pure oil. More specifically, and for example, the viscosity of petroleum ether and neat Saudi heavy oil are approximately 0.00024 Pa s and 0.03921 Pa s, respectively. The viscosities of the mixtures having about a 1:1 ratio and about a 10:1 ratio of petroleum ether to neat Saudi heavy oil are approximately 0.00307 Pa s and 0.00038 Pa s, respectively, at room temperature. By reducing the viscosity of the resulting mixture used as feed to adsorption column 102, the pressure throughout adsorption column 102 is reduced and mass transfer limitations on adsorption are also reduced. Further, it has been determined that the dilution of the oil 116 facilitates achieving the desired adsorption and impurity removal.

In one embodiment, to facilitate removing asphaltenes and high molecular weight residues, resins, and bitumen from the solvent and oil mixture, the solvent and oil mixture is centrifuged prior to being supplied to adsorption column 102. Removal of the asphaltenes is especially beneficial when a continuous process is being used to treat oil 116, such that the build-up of pressure in the adsorption column is facilitated to be reduced. By centrifuging the mixture and removing the asphaltenes, a particulate-free feed stream can be obtained that facilitates reducing pressure increases and/or impeded flow within the column. In an alternative embodiment, adsorbent material 108 is packed within adsorption column 102 such that the largest particles are positioned at the feed end 104 of adsorption column 102. The larger particles act as a filter to facilitate removing at least a portion of asphaltenes and high molecular weight residues, resins, and bitumen that may be present in oil 116.

The solvent and oil mixture is directed to feed end 104 of adsorption column 102. In the exemplary embodiment, the mixture is directed in a single pass through adsorption column 102 at a flow rate that is sufficient to facilitate removing the impurities. In the exemplary embodiment, a flow rate corresponding to approximately 10 to 20 minutes of residence time is sufficient. Faster flow rates are possible, but may be limited by excessive pressures. In one embodiment, multiple columns coupled in series may be used. In such an embodiment, a first column can remain in service until it is completely saturated, after which a second column becomes the first and a new column becomes the second column in the series. This is a common strategy for maximizing adsorption capacity. In another embodiment, multiple columns coupled in parallel may be used to manage overall size and pressures of the columns. After purification, the resulting treated oil is then channeled to treated oil storage tank 128 to be stored for future use. In one embodiment, the treated oil is passed through a flash column and/or distillation equipment prior to being stored in tank 128. The flash column, and/or distillation equipment, facilitates removing the solvent to be recycled. In the exemplary embodiment, the solvent, petroleum ether, is then recirculated throughout adsorption column 102 to remove useful or relatively vanadium free oil that may remain in adsorption column 102. In one embodiment, the recirculated solvent and oil mixture is passed through a flash column and/or distillation equipment to facilitate separating the solvent and oil.

Next, solvent composition 112 is directed from solvent composition storage tank 110 to adsorption column 102 wherein it is directed through adsorbent material 108. The polar/non-polar composition of solvent composition 112 facilitates oil and other impurities, such as vanadium, nickel, and sulfur compounds, to be desorbed from adsorbent material 108. Without being bound to any particular theory, it is believed that the polar component of solvent composition 112 bonds to adsorbent material 108 through hydrogen bonding with siloxane groups present on the soiled adsorbent material 108. The binding of the siloxane groups enables non-polar oil adsorbed onto adsorbent material 108 to be released from adsorbent material 108. The released oil dissolves in the non-polar component of solvent composition 112. The polar component of solvent composition 112 may then be removed from adsorbent material 108 using any suitable technique, thus returning adsorbent material 108 to its original state for further use as an adsorbent. In an alternative embodiment, adsorbent 108 is removed from adsorption column 102 and is contacted by solvent composition 112 in an alternative manner.

In the exemplary embodiment, petroleum ether is then passed through adsorption column 102 to rinse excess solvent composition 112 from adsorption column 102. In an alternative embodiment, any solvent capable of rinsing excess solvent composition 112 from adsorption column 102 may be used. In the exemplary embodiment, the process of directing solvent composition 112 through adsorption column 102 and rinsing excess solvent composition 112 from adsorption column 102 with a solvent, is repeated at least two additional times. In an alternative embodiment, these additional steps are not taken. In another embodiment, the process is repeated at least four or more times.

Next, in the exemplary embodiment, the mixture of solvent composition 112 and the removed oil and impurities is directed through flash unit 118. As described above, solvent composition 112, in the exemplary embodiment, has a boiling point of less than about 80° C., which is lower than the average boiling range of oil 116 and of impurities such as vanadium, nickel, and sulfur compounds. As such, solvent composition 112 will separate from the oil and impurities, and solvent composition 112 will exit flash unit 118 via exit portion 122. The recycled solvent composition is then sent to solvent composition storage tank 110 for further use in adsorption column 102. The remaining oil and impurities exit flash unit 118 via exit portion 124 and are channeled to waste storage tank 126.

The final step, in one embodiment, is to dry adsorption column 102 and adsorbent material 108 with a flow of a suitable gas such as nitrogen, air, etc. In the exemplary embodiment, the jacket 107 of adsorption column 102 is heated to about 80° C. and a nitrogen stream 130 is directed through adsorption column 102 at a flow rate of about 35 to about 40 cc/min for approximately two hours. After drying, in the exemplary embodiment, adsorbent material 108 is rewetted with petroleum ether and the next adsorption cycle is ready to begin.

EXAMPLES

The examples which follow are merely illustrative, and should not be construed to be any sort of limitation on the scope of the claimed invention.

Example 1

Regeneration of Spent Adsorbents Using Polar/Non-Polar Wash Solutions

In the first example, spent adsorbent was prepared. More specifically, in this example, approximately 35 grams of Britesorb® D350EL silica adsorbent was weighed into a blender, and approximately 100 g of Saudi heavy crude oil and 200 g of petroleum ether were then added to the blender. The resulting slurry was mixed for about five minutes at room temperature and was then poured into centrifuge tubes. Each tube was centrifuged, and the resulting liquid fractions were decanted, thus leaving soiled, or spent, Britesorb® D350EL solids. The soiled Britesorb® D350EL solids were dried under vacuum at 80° C. for about two hours. The dried solids were then analyzed using a Thermogravimetric Analyzer (TGA). The percent weight loss between the initial onset of devolatization and/or decomposition at about 200° C. to about 650° C. was taken as the removal of the residual organic material (oil components) from the adsorbent. The results indicated that the soiled Britesorb® solids comprised about 34.2 wt. % oil components.

Wash solutions comprising various amounts of polar and/or non-polar solvents were prepared. Exemplary solvents used to prepare the wash solutions and the amount of each solvent are set forth in Table 1 below.

Spent, or soiled, Britesorb® D350EL solids in the amount of about 0.5 g were measured into a vial, along with about 13 g of the particular wash solution being tested. The resulting slurry was mixed for about five minutes on an auto-shaker at room temperature and poured into centrifuge tubes. Each tube was centrifuged and the resulting liquid fractions were decanted, leaving Britesorb® solids. The washed Britesorb® solids were subjected to two additional washing cycles, as described above. The washed Britesorb® solids were analyzed using TGA to determine an amount of oil remaining in the Britesorb® solids following the washing.

Figure 2:
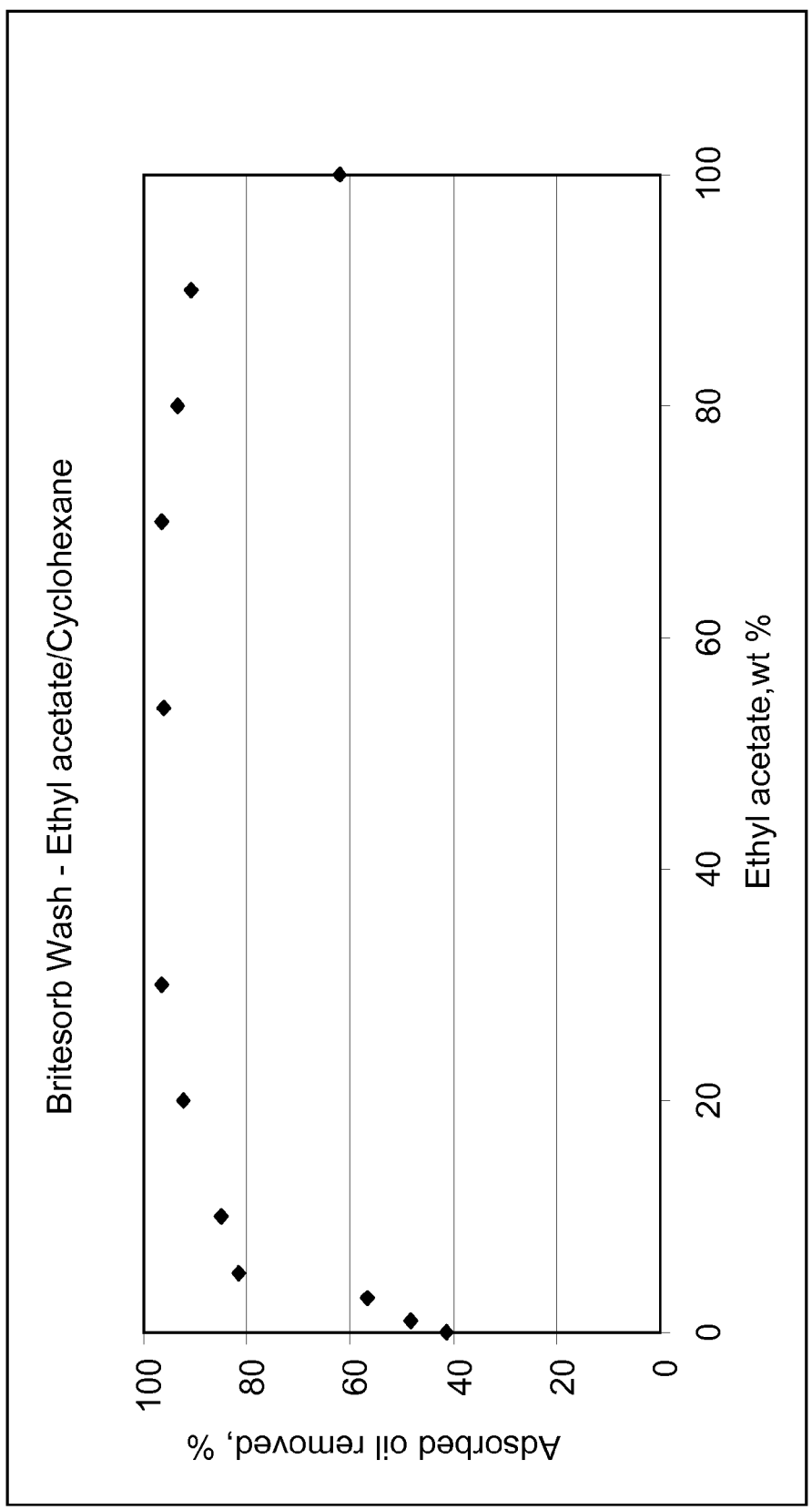
FIG. 2 is an exemplary graph illustrating an amount of adsorbed oil removed from Britesorb® solids following washing with an ethyl acetate/cyclohexane solvent composition as illustrated in Example 1.
Figure 3:
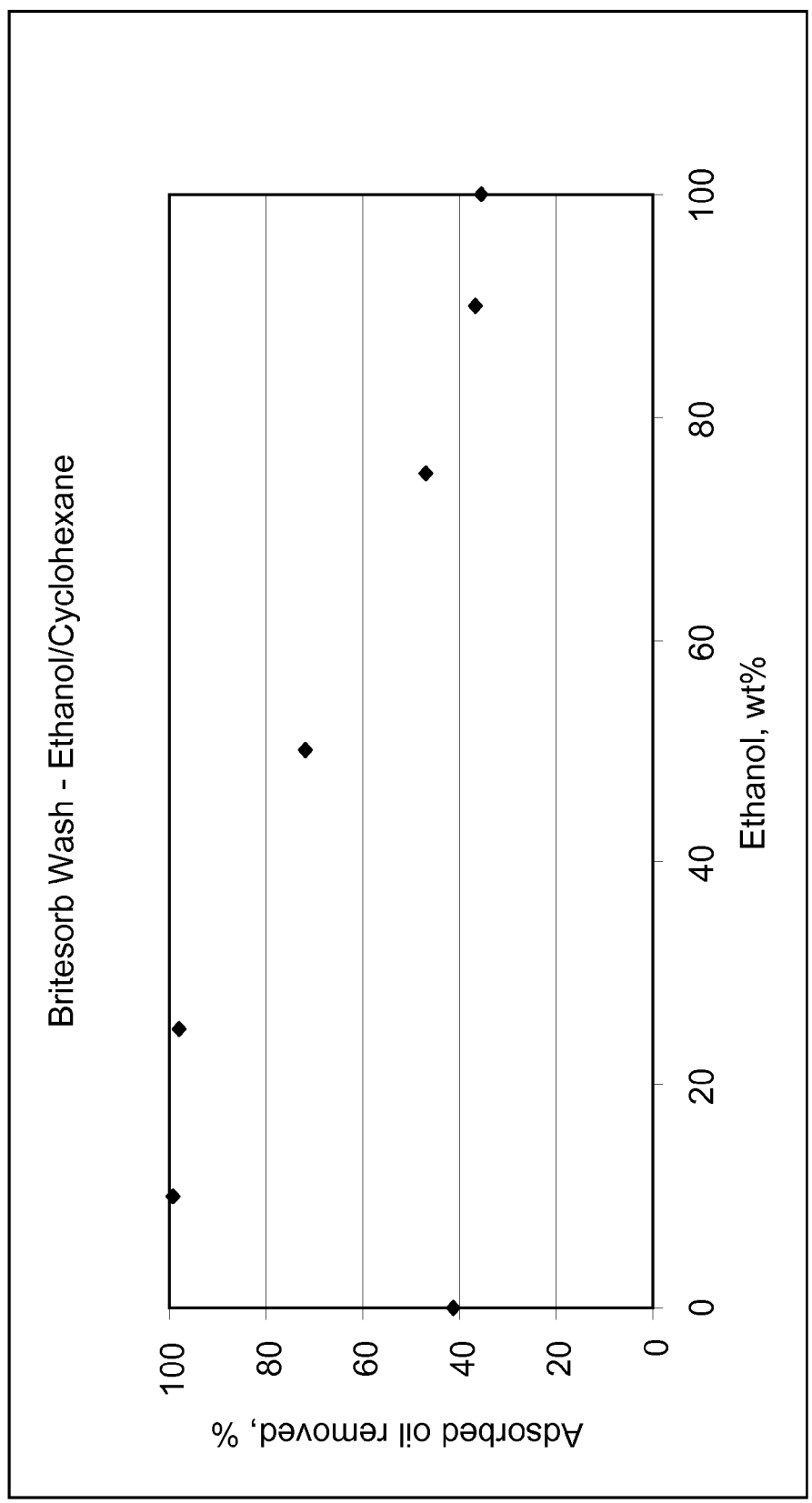
FIG. 3 is an exemplary graph illustrating an amount of adsorbed oil removed from Britesorb® solids following washing with an ethanol/cyclohexane solvent composition as illustrated in Example 1.

TGA is performed by placing about 5-10 mg of the soiled adsorbent into a small platinum pan and the initial weight is accurately weighed and recorded by the instrument. The furnace is raised up around the sample and the temperature is increased at 10-20° C./minute intervals to the desired set point of about 650-700° C. for Britesorb, with air flowing through the sample at 0.04 standard cubic feet per hour (scfh). As the temperature is increased, oil components are volatilized and/or decomposed and removed from the adsorbent, resulting in a corresponding weight loss. The weight loss corresponds precisely to the oil that was present within the adsorbent. By knowing the starting oil present and the oil remaining after washing, an efficacy of the wash step can be quantified. Exemplary results are set forth in Table 1 below. Two exemplary graphs illustrating the amount of adsorbed oil removed from the soiled Britesorb® D350EL solids following washing with wash solutions including various ratios of ethyl acetate and cyclohexane or ethanol and cyclohexane are illustrated in FIGS. 2 and 3, respectively.

TABLE 1

| Solvent 1 | Solvent 1% wt | Solvent 2 | Solvent 2% wt | % Oil Removed |
|---|---|---|---|---|
| Ethyl acetate | 0 | Cyclohexane | 100 | 41.4 |
| Ethyl acetate | 1 | Cyclohexane | 99 | 48.2 |
| Ethyl acetate | 3 | Cyclohexane | 97 | 56.6 |
| Ethyl acetate | 5 | Cyclohexane | 95 | 81.6 |
| Ethyl acetate | 10 | Cyclohexane | 90 | 85.1 |
| Ethyl acetate | 20 | Cyclohexane | 80 | 92.4 |
| Ethyl acetate | 30 | Cyclohexane | 70 | 96.6 |
| Ethyl Acetate | 54 | Cyclohexane | 46 | 96.1 |
| Ethyl Acetate | 70 | Cyclohexane | 30 | 96.5 |
| Ethyl Acetate | 80 | Cyclohexane | 20 | 93.6 |
| Ethyl Acetate | 90 | Cyclohexane | 10 | 90.9 |
| Ethyl acetate | 100 | Cyclohexane | 0 | 62.1 |
| Ethanol | 0 | Cyclohexane | 100 | 41.4 |
| Ethanol | 10 | Cyclohexane | 90 | 99.3 |
| Ethanol | 25 | Cyclohexane | 75 | 98.0 |
| Ethanol | 50 | Cyclohexane | 50 | 71.8 |
| Ethanol | 75 | Cyclohexane | 25 | 46.8 |
| Ethanol | 90 | Cyclohexane | 10 | 36.9 |

TABLE 1-continued

| Solvent 1 | Solvent 1% wt | Solvent 2 | Solvent 2% wt | % Oil Removed |
|---|---|---|---|---|
| Ethanol | 100 | Cyclohexane | 0 | 35.4 |
| Methylene chloride | 100 | | 0 | 80.6 |
| Ethyl acetate | 100 | | 0 | 62.1 |
| Cyclohexane | 100 | | 0 | 41.4 |
| Petroleum ether | 100 | | 0 | 40.5 |
| Ethanol | 100 | | 0 | 35.4 |
| Hexane | 100 | | 0 | 34.7 |
| Heptane | 100 | | 0 | 33.7 |
| Pentane | 100 | | 0 | 30.2 |
| 2-propanol (IPA) | 33 | Cyclohexane | 67 | 98.9 |
| Acetone | 59 | Hexane | 41 | 94.8 |
| Acetone | 67 | Cyclohexane | 33 | 93.5 |
| Ethanol | 48 | Heptane | 52 | 80.9 |
| Ethanol | 21 | Hexane | 79 | 80.5 |
| 2-propanol (IPA) | 56 | Ethyl acetate | 44 | 78.9 |
| Ethanol | 31 | Ethyl Acetate | 69 | 68.8 |
| Methanol | 49 | Ethyl acetate | 51 | 54.1 |
| Acetone | 88 | Methanol | 12 | 47.8 |

As can be seen from the above results, wash solutions comprising both a polar and non-polar solvent were generally more effective at removing oil from the soiled Britesorb® solids than wash solutions that included only a polar or only a non-polar solvent. In particular, wash solutions including a mixture of ethyl acetate and cyclohexane in a 5:95 to a 90:10 ratio of ethanol and cyclohexane in a 10:90 to a 25:75 ratio were capable of removing greater than about 80% of the adsorbed oil from the soiled adsorbent. Other combinations of polar and non-polar solvents were also effective in removing adsorbed oil. In contrast, the only wash solution that removed more than about 80% of adsorbed oil that did not include a mixture of a polar and non-polar solvent was methylene chloride. When petroleum ether was used to wash, only a portion of the oil was removed, and the oil that was removed was very low in impurities such as vanadium and nickel. However, when the washing was efficient, such as with the polar and non-polar combinations, such as ethanol/cyclohexane, the impurities were also removed with the oil. Exemplary results are set forth in Table 2 below.

TABLE 2

| | Solvent Mixture | V, ppm | TGA, % wt loss |
|---|---|---|---|
| 1 | 21% Ethanol/79% Hexane | 1.1 | 11.62% |
| 2 | 46% Cyclohexane/54% Ethyl Acetate | 1.7 | 6.32% |
| 3 | 48% Ethanol/52% Heptane | 0.6 | 11.48% |
| 4 | 77% Ethyl acetate/23% 2-propanol (IPA) | 0.5 | 12.17% |
| 5 | 59% Acetone & Hexane | 0.9 | 6.77% |
| 6 | 31% Ethanol & Ethyl acetate | 0.5 | 15.62% |
| 7 | 51% Ethyl acetate & Methanol | 0.2 | 20.60% |
| 8 | 88% Acetone & Methanol | 0.4 | 22.75% |
| 9 | 1% Ethyl acetate/99% Cyclohexane | 0.1 | 22.60% |
| 10 | 3% Ethyl acetate/97% Cyclohexane | 0.8 | 19.77% |
| 11 | 5% Ethyl acetate/95% Cyclohexane | 0.9 | 11.24% |
| 12 | 10% Ethyl acetate/90% Cyclohexane | 1.1 | 10.07% |
| 13 | 20% Ethyl acetate/80% Cyclohexane | 1.1 | 7.60% |
| 14 | 30% Ethyl acetate/70% Cyclohexane | 1.2 | 6.15% |
| 15 | 46% Cyclohexane/54% Ethyl Acetate | 1.7 | 6.32% |
| 16 | Methylene chloride | 0.5 | 11.60% |
| 17 | Petroleum Ether | <0.1 | 30.57% |
| 18 | Pentane | <0.1 | 35.03% |
| 19 | Hexanes | <0.1 | 33.07% |
| 20 | Heptane | <0.1 | 33.49% |
| 21 | Ethyl Acetate | <0.1 | 21.30% |
| 22 | Ethanol | <0.1 | 32.76% |
| 23 | 25% Ethanol/75% Cyclohexane | 0.5 | 5.87% |
| 24 | 10% Ethanol/90% Cyclohexane | 0.6 | 5.31% |

Example 2

Regeneration of Britesorb D350 EL® Using Ethyl Acetate and Cyclohexane

Initially, about 3.5 g of Britesorb D350 EL® xerogel silica was weighed into a blender and about 10 g of crude oil and 40 g of petroleum ether was added to the blender. The resulting slurry was mixed for 2 minutes and was then poured into centrifuge tubes. Each tube was then centrifuged and the liquid fraction was decanted into vials, and the vanadium and nickel contents of the liquid fraction were measured by Inductively Coupled Plasma Emission Spectrometry/Mass Spectrometry (ICP/MS).

The solid fraction, or spent adsorbent, was then extracted with cyclohexane and ethyl acetate. The resulting solids were analyzed and the results illustrate that neither the cyclohexane nor the ethyl acetate alone removed all of the adsorbed oil. Next, the solid fraction was extracted with a binary solution consisting of 3 wt. % ethyl acetate and 97 wt. % cyclohexane. The resulting solids were analyzed and the results illustrate that the binary solution removed nearly all of the adsorbed species. Exemplary results are set forth in Tables 3 and 4 below.

TABLE 3

| Spent adsorbent washed with EtOH-Cyclohexane Mixture | Ni, ppm | V, ppm |
|---|---|---|
| Column wash resid rotovap #1 | 6.98 | 27.53 |
| | 6.96 | 27.62 |
| Column wash resid rotovap #2 | 21.2 | 81.08 |
| | 17.0 | 60.32 |
| Column wash resid rotovap #3 | 19.61 | 74.56 |
| | 17.92 | 65.81 |
| Column wash resid rotovap #4 | 23.03 | 88.37 |
| | 22.84 | 88.37 |
| Column wash resid rotovap #5 | 20.25 | 75.66 |
| | 19.84 | 73.32 |
| Column wash resid rotovap #6 | 20.52 | 74.69 |
| | 18.54 | 66.29 |
| Column wash resid rotovap #7 | 19.22 | 71.67 |
| | 18.14 | 65.74 |
| Column wash resid rotovap #8 | 1.72 | 50.65 |
| | 1.84 | 49.12 |

TABLE 4

| Sample Name (solids by ICP/MS) | V, ug/g +/−95% CI |
|---|---|
| Britesorb D350EL (neat) | 1 < X < 5 |
| Britesorb A100 (neat) | <1 |
| Column1-btm exit (Spent BSD350EL) | 35 ± 1 |
| Column1-mid section (Spent BSD350EL) | 40 ± 1 |
| Column1-top feed (Spent BSD350EL) | 59 ± 1 |
| Spent Britesorb D350EL | 25 ± 1 |
| | 24 ± 1 |
| Et—OH/Cyclohexane Regen-(2 g BS - 10 × 5 ml no stir) | 1 < X < 5 |
| Et—OH/Cyclohexane Regen-(5 × 1 min mixing) | 1 < X < 5 |
| Et—OH/Cyclohexane Regen-(2 g BS 5 × 1 min mixing) | 1 < X < 5 |
| | 1 < X < 5 |

Example 3

Re-Use of Extracted Britesorb D350 EL®

Initially, about 2.53 g of spent Britesorb® D350EL that was extracted with ethyl acetate/cyclohexane was weighed into a blender, and about 7.25 g of crude oil and 29 g of petroleum ether was added to the blender. The resulting slurry was mixed and poured into centrifuge tubes. Each tube was centrifuged and the liquid fraction was decanted into vials. The vanadium and nickel contents were then measured by ICP/MS. The nickel and vanadium concentration of the oil-petroleum ether solution was below 0.1 ppm.

Example 4

Repeated Use of Regenerated Adsorbent Material

To facilitate enhancing the economic benefits of each of the above-described processes, the adsorbent would have to be reused several times. A set of tests was conducted in which the same Britesorb® D350EL was used for about 25 cycles. A full cycle includes an adsorption step and a regeneration step.

Each test was completed in the same column that comprised a 1-inch by 25-inch tall column, wherein the bed height was approximately 13 inches. Britesorb® C935 was loaded into the column, and the adsorption process was completed using Saudi heavy crude oil mixed with petroleum ether in a 1 to 2 ratio. The column was then washed with petroleum ether to remove clean oil from the adsorbents. Typically, some clean oil is held within the void spaces of the particles while the "dirty oil" is held more strongly by the adsorbent. The adsorbent was removed from the column, batch washed three times with a mixture of 69 wt. % cyclohexane and 31 wt. % ethanol, and dried in a vacuum oven at 80° C. overnight. This sequence was repeated 25 times without any effect on the adsorption capability as evidenced by the number of vanadium free samples obtained during each adsorption cycle. All column adsorption tests produced approximately the same number of clean oil samples indicating that the adsorbent had been fully regenerated. Samples were analyzed by ICP/MS, and results showed that samples were in specification, i.e., less than 0.2 ppm vanadium by weight of the oil.

Figure 4:
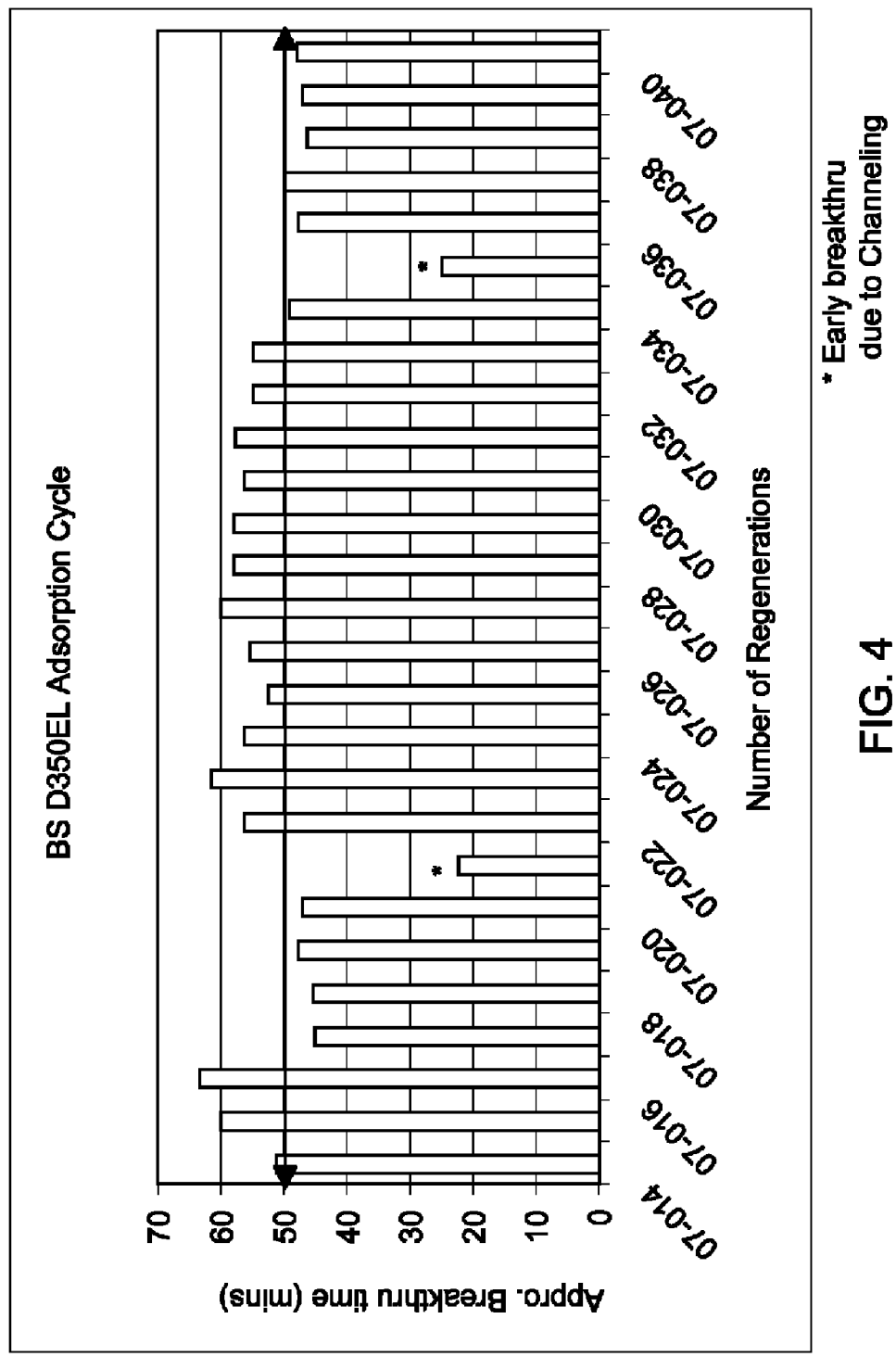
FIG. 4 is an exemplary graph illustrating an approximate breakthrough time of multiple regeneration steps as illustrated in Example 4.

The effectiveness of each adsorption cycle was also evident from the time that each adsorption column was operated, as is illustrated in FIG. 3. FIG. 3 illustrates an exemplary time of each adsorption cycle until breakthrough. The operating time ranged from 45-65 minutes and there appears to be no trending downward as might be expected if the adsorbent were losing effectiveness. However, two tests fell short of this range with a time of approximately half the average, i.e., tests 07-022 and 07-036. Although it is not clear exactly what the reason was for this shortfall, one possible reason is early breakthrough due to channeling effects within the adsorption column. This set of exemplary tests, illustrated in FIG. 4, demonstrates the capability of the adsorbent to be regenerated for 25 cycles.

Figure 5:
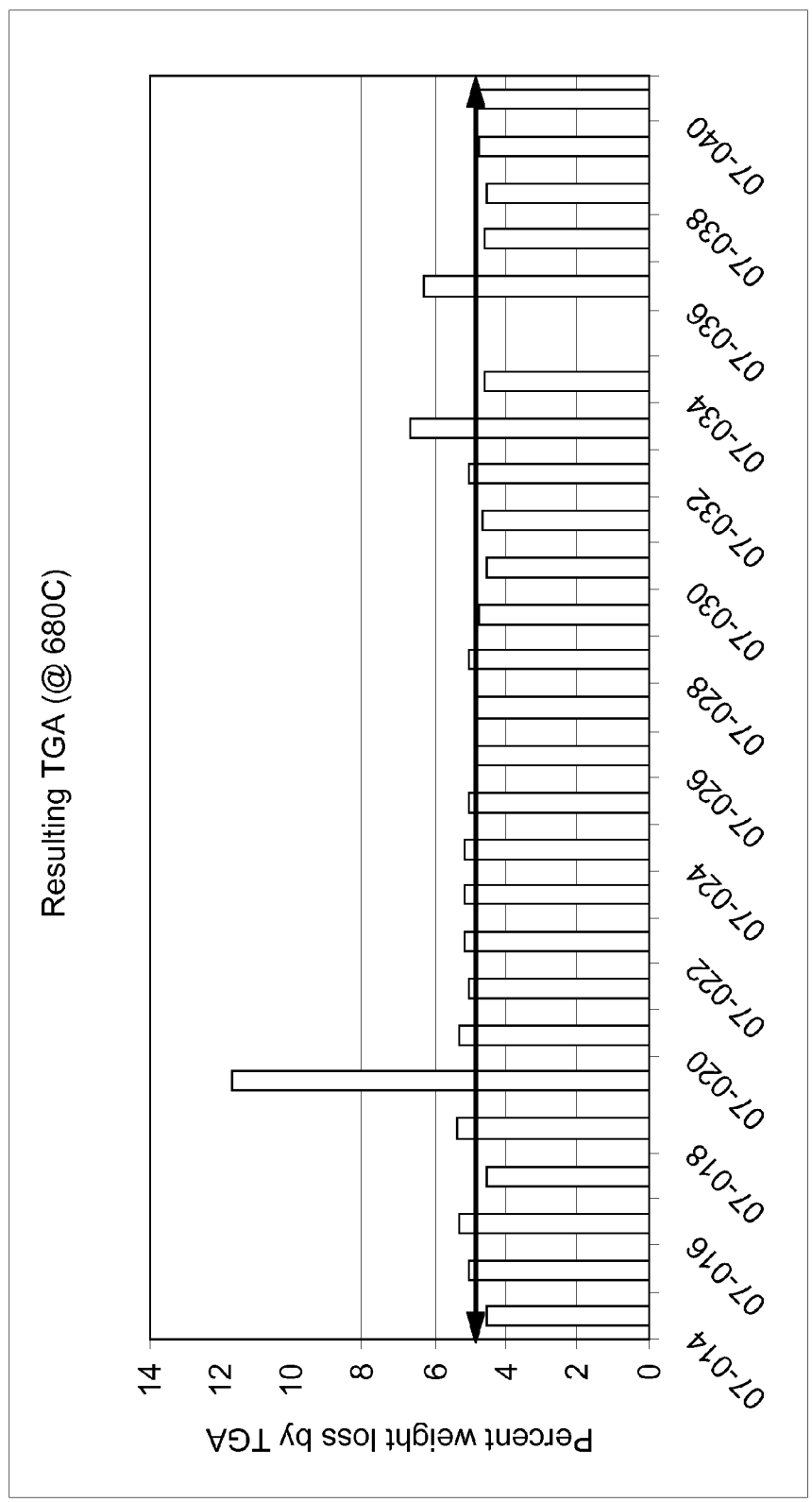
FIG. 5 is an exemplary graph illustrating a TGA analysis for the cycles analyzed in FIG. 4.

As mentioned above, each cycle includes an adsorption step and a regeneration step. After each regeneration, i.e. solvent composition wash and drying, a sample was taken for TGA analysis to determine an amount of oil remaining on the Britesorb®. From previous TGA analyses, it was determined that for Britesorb® with no exposure to oil, the weight loss was approximately 4.5-5.0%. This weight loss was due to the water and/or other impurities that are within a hydrogel matrix. FIG. 5 illustrates the TGA analyses for the 25 cycles. Most of the cycles resulted in a weight loss of approximately 5%, which indicates that virtually all the oil components had been successfully washed from the adsorbent. However, one test, namely the sixth test, resulted in a weight % significantly higher than the others, which had nearly 12% residual materials on the adsorbent.

Example 5

In-Situ Regeneration

As described in Example 4, 25 cycles of adsorption/regeneration were successfully completed in which the adsorbent was removed and washed external to the column. Although this process proved to be successful, it was also a time-consuming process. As such, it would be preferred to regenerate complete cycles without removing the adsorbent from the column, or to provide a process for "in-situ" regeneration.

Figure 6:
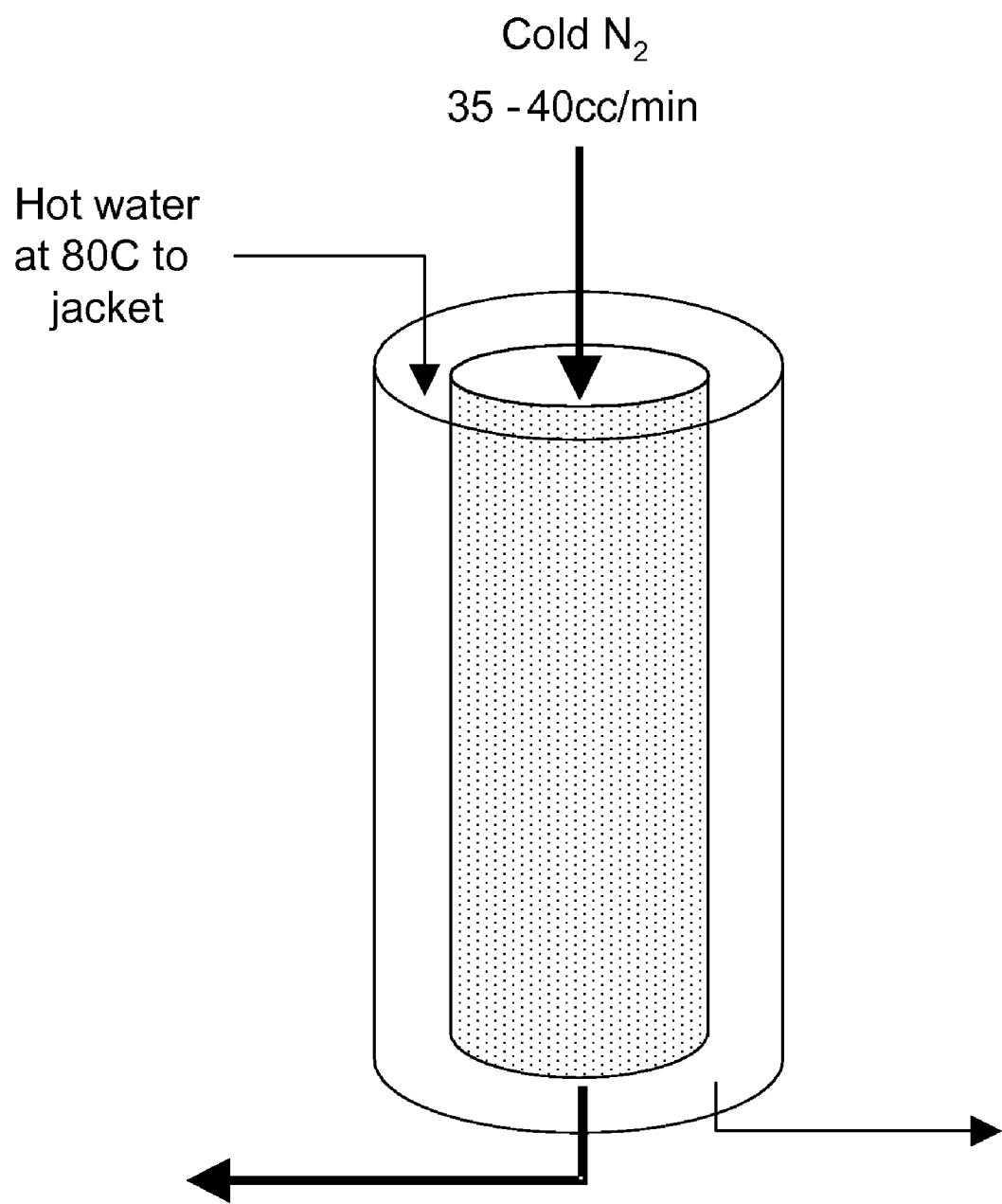
FIG. 6 is an exemplary schematic diagram of an apparatus that may be used to complete the experiments described in Example 5.

FIG. 6 illustrates an exemplary apparatus that may be used to perform the in-situ regeneration. The slurry of Britesorb® and petroleum ether is loaded into an adsorption column and petroleum ether is then recirculated through the column for approximately 0.25 hours to equilibrate the bed. The adsorption process is completed using Saudi heavy oil until breakthrough after approximately one hour. The column is then rinsed with petroleum ether to remove useful or relatively vanadium free oil. A mixture of cyclohexane and ethanol is directed through the column for a pre-determined time period to remove the remainder of the oil components, including vanadium, nickel, and sulfur compounds.

Petroleum ether is once again directed through the column to remove residual cyclohexane and ethanol. Directing the cyclohexane and ethanol mixture completes one full washing step. In the exemplary embodiment, the washing process is completed at least three times. The adsorbent is then dried with a nitrogen purge by heating the column jacket and by injecting a nitrogen purge through the column at a desired flow rate for a pre-determined time period. After drying, the column is rewetted with petroleum ether and is then ready for the next adsorption cycle. The above-described procedure is repeated at least three times.

Table 5, illustrated below, illustrates a exemplary procedure performed for the in-situ regeneration as well as the time to accomplish each procedure. As shown in Table 5, the regeneration (steps 4-8) is accomplished in approximately 6 hours when the washing cycle is completed three times. When the washing cycle is completed only once, the regeneration time is approximately 4.5 hours.

TABLE 5

| | |
|---|---|
| 1. Load Column with Britesorb slurry | |
| 2. Circulate petroleum ether to expel air bubbles | 0.25 |
| 3. Feed de-asphaltated Oil/PE mixture until breakthrough | 1.0 |
| 4. Wash column with PE to recover "useful" oil | 0.5 |
| 5. Regenerate Britesorb with Ethanol-Cyclohexane mixture | 1.0 |
| 6. Rinse-off excess EtOH-Cyclohexane from the column with PE | 0.75 |
| 7. Repeat steps 5 and 6 | 1.75 |
| 8. Dry column with nitrogen flow at 40 cc/min for t = 2 hours (Jacket temperature T = 80° C.) | 2.0 |
| 9. Re-wet column with petroleum ether and start another adsorption cycle | |

The methods and apparatus described herein facilitates the regeneration of adsorbent material that has been used to purify a supply of fuel or oil for use in an industrial setting, such as for a gas turbine. Specifically, regenerating spent adsorbent material by use of a solvent composition facilitates minimizing the amount of energy used to regenerate adsorbent material, in comparison to known thermal methods. Further, by using a stationary column for both the purification and regeneration processes, the capital costs associated with a fuel treatment process for fuel treatment facilities are decreased. In addition, the footprint of such a process is also reduced. Moreover, because the same adsorbent material may be used repeatedly, the operating costs of an industrial facility may be reduced. Moreover, utilizing a stationary adsorption column facilitates minimizing adsorbent handling, adsorbent metering issues, and typical start-up and shut-down issues that may be typically encountered with other continuous processes. Also, the washing of the adsorption column to recover any residual oil left in the column facilitates maximum oil recovery. Moreover, by passing the solvent composition through a distillation and/or flash unit, after the solvent composition has removed oil and impurities from the adsorbent material, the solvent composition can be recycled and thus, facilitates reducing the operating costs of the facility. The description above is meant to cover a specific example of the general process for removing impurities from a fuel or oil, and should not be found limited to the specific embodiment described.

Exemplary embodiments of adsorption columns and the regeneration of adsorbent material packed within adsorption columns are described above in detail. The methods and systems are not limited to the specific embodiments described herein nor to the specific illustrated adsorption column and regeneration steps, but rather, steps of the method and/or components of the system may be utilized independently and separately from other steps and/or components described herein. Further, the described method steps and/or system components can also be defined in, or used in combination with, other methods and/or systems, and are not limited to practice with only the method and system described herein. The description above is meant to cover a specific example of the general process for removing impurities from fuel or oil and regenerating the adsorbent material used to do so and should not be found limited to the specific embodiment described.

While the invention has been described in terms of various specific embodiments, those skilled in the art will recognize that the invention can be practiced with modification within the spirit and scope of the claims.

What is claimed is:

1. A method for regenerating adsorbent material, said method comprising:
    providing a spent adsorbent material;
    contacting the adsorbent material with a solvent composition to facilitate removing oil and impurities from said spent adsorbent material; and
    directing only the solvent composition through a solvent recovery device to facilitate removing oil from the solvent composition.

2. A method in accordance with claim 1, wherein providing a spent adsorbent material comprises:
    packing an adsorbent material within an adsorption device; and
    directing at least one of an oil and an oil/petroleum ether solution through the adsorption device.

3. A method in accordance with claim 2, wherein contacting the adsorbent material with a solvent composition comprises directing the solvent composition through the adsorbent material packed within the adsorption device.

4. A method in accordance with claim 1, wherein contacting the adsorbent material with a solvent composition comprises contacting the adsorbent material with a solvent that includes at least one polar compound and at least one non-polar compound, wherein the at least one polar compound is selected from the group consisting of acetone; alcohols, such as isopropanol, ethanol, and methanol; methylene chloride; ethyl acetate; and combinations thereof and the at least one non-polar compound is selected from the group consisting of hexane, heptane, methylcyclopentane, pentane, benzene, toluene, cyclohexane, and combinations thereof.

5. A method in accordance with claim 1, wherein contacting the adsorbent material with a solvent composition comprises contacting the adsorbent material with a solvent that includes from about 0 to about 100 weight % ethyl acetate and from about 0 to about 100 weight % cyclohexane.

6. A method in accordance with claim 1, wherein contacting the adsorbent material with a solvent composition further comprises selecting a solvent composition based on the properties of the spent adsorbent and the properties of the impurities to be removed from the spent adsorbent.

7. A method in accordance with claim 1, wherein contacting the adsorbent material with a solvent composition comprises contacting the adsorbent material with a solvent that includes from about 10 to about 30 weight % ethanol and from about 70 to about 90 weight % cyclohexane.

8. A method in accordance with claim 1 further comprising washing the spent adsorbent material with petroleum ether prior to contacting the adsorbent material with the solvent composition to facilitate removing oil and impurities not adsorbed on said adsorbent material.

9. A method in accordance with claim 1 further comprising rinsing the adsorbent material with petroleum ether after contacting the adsorbent material with the solvent composition, wherein rinsing the adsorbent material facilitates removing at least a portion of the solvent composition remaining on the adsorbent material.

10. A method for regenerating spent adsorbent material, said method comprising:
    inserting absorbent material into an adsorption device;
    directing at least one of an oil and an oil/petroleum ether solution through the adsorption device;
    directing a first solvent through the adsorption device to facilitate recovering at least a portion of the oil remaining in the adsorption device;
    directing a second solvent through the adsorption device;
    directing the first solvent through the adsorption device to facilitate removing at least a portion of the second solvent remaining in the adsorption device; and
    directing only the first solvent through a solvent recovery device to facilitate removing oil from the first solvent.

11. A method in accordance with claim 10, wherein directing a second solvent through the adsorption device comprises directing a second solvent through the adsorption device, wherein the second solvent includes at least one polar component and at least one non-polar component, wherein directing the second solvent through the adsorption device facilitates removing oil, vanadium, nickel, and sulfur compounds from the adsorbent material.

* * * * *